United States Patent [19]

Vincent et al.

[11] 4,424,649
[45] Jan. 10, 1984

[54] ABRASIVE CUTTER

[75] Inventors: Donald P. Vincent, Lake Zurich; Hubert J. Thomiszer, Skokie, both of Ill.

[73] Assignee: Buehler Ltd., Lake Bluff, Ill.

[21] Appl. No.: 295,711

[22] Filed: Aug. 24, 1981

[51] Int. Cl.³ .............................................. B24B 7/02
[52] U.S. Cl. .................................... 51/92 R; 51/231; 125/13 R
[58] Field of Search ................. 51/34 G, 74 R, 92 R, 51/224, 231; 74/110; 83/437, 728; 125/13 R; 408/135

[56] References Cited

U.S. PATENT DOCUMENTS

| | | | |
|---|---|---|---|
| 1,233,608 | 7/1917 | Sacrey | 51/92 R |
| 2,486,765 | 11/1949 | Snyder | 125/13 R |
| 3,405,032 | 10/1968 | Barrus et al. | 74/110 |
| 3,467,075 | 9/1969 | Cary | 125/13 R |
| 3,757,638 | 9/1973 | Martin | 408/135 |
| 4,107,883 | 8/1978 | Bein | 125/13 R |

*Primary Examiner*—Harold D. Whitehead
*Attorney, Agent, or Firm*—Charles F. Pigott, Jr.

[57] ABSTRACT

An abrasive cutter for cutting metallurgical samples and the like including a motor-driven rotatable abrasive cutter wheel, a vise assembly for holding a workpiece to be cut, and a manually operable workpiece advance lever which is actuated by an operator to move the vise assembly along a horizontal path toward the cutter wheel thereby bringing the workpiece into engagement with the cutter wheel.

6 Claims, 9 Drawing Figures

ABRASIVE CUTTER

BRIEF SUMMARY OF THE INVENTION

The abrasive cutter of the present invention is particularly advantageous over previously known abrasive cutters relative to the manner in which the workpiece and the abrasive cutter wheel are brought into engagement for a cutting operation.

In many known abrasive cutters the workpiece is held in a stationary vise and the cutter wheel spindle assembly and the drive motor for rotating the cutter wheel are both mounted on a platform which is pivotally movable to bring the cutter wheel into and out of engagement with a stationary workpiece. There is also known a somewhat similar system where the motor and cutter wheel spindle assembly are stationary and the vise which holds the workpiece is mounted on a pivotally movable platform which permits the workpiece to be swung or pivoted into engagement with a rotating cutter wheel.

The foregoing known systems are subject to certain serious disadvantages. They are high inertia systems and they transmit no "feel" of the cut to the operator, which makes it more difficult for the operator to consistently make a good cut without damaging the cutter wheel or the sameple workpiece being cut. In addition, they require an appreciable physical effort to operate, and they afford only a direct 1:1 ratio between movement of an actuator handle and movement of a workpiece toward the cutter wheel.

It is an object of our invention to provide an abrasive cutter where the vise assembly which holds the workpiece is mounted on a platform which slides on antifriction bearings along a straight line for bringing a workpiece into engagement with a rotating cutter wheel.

Another object of the invention is to provide an improved abrasive cutter as last above-mentioned which includes a vise mounting platform which slides on horizontal shafts and thereby moves the workpiece along a horizontal path to bring it into engagement with a rotating cutter wheel.

A further object of the invention is to provide a manually operable table advance lever which is interconnected by appropriate rack and gear means with the vise mounting platform and is designed to provide a ratio of advance lever movement to workpiece movement which is substantially in excess of one.

The foregoing and other objects and advantages of the invention will be apparent from the following description of a preferred embodiment, taken in conjunction with the accompanying drawings.

Now, in order to acquaint those skilled in the art with the manner of making and using our invention, we shall describe, in conjunction with the accompanying drawings, a preferred embodiment of our invention.

DETAILED DESCRIPTION OF THE INVENTION

Figure 1:
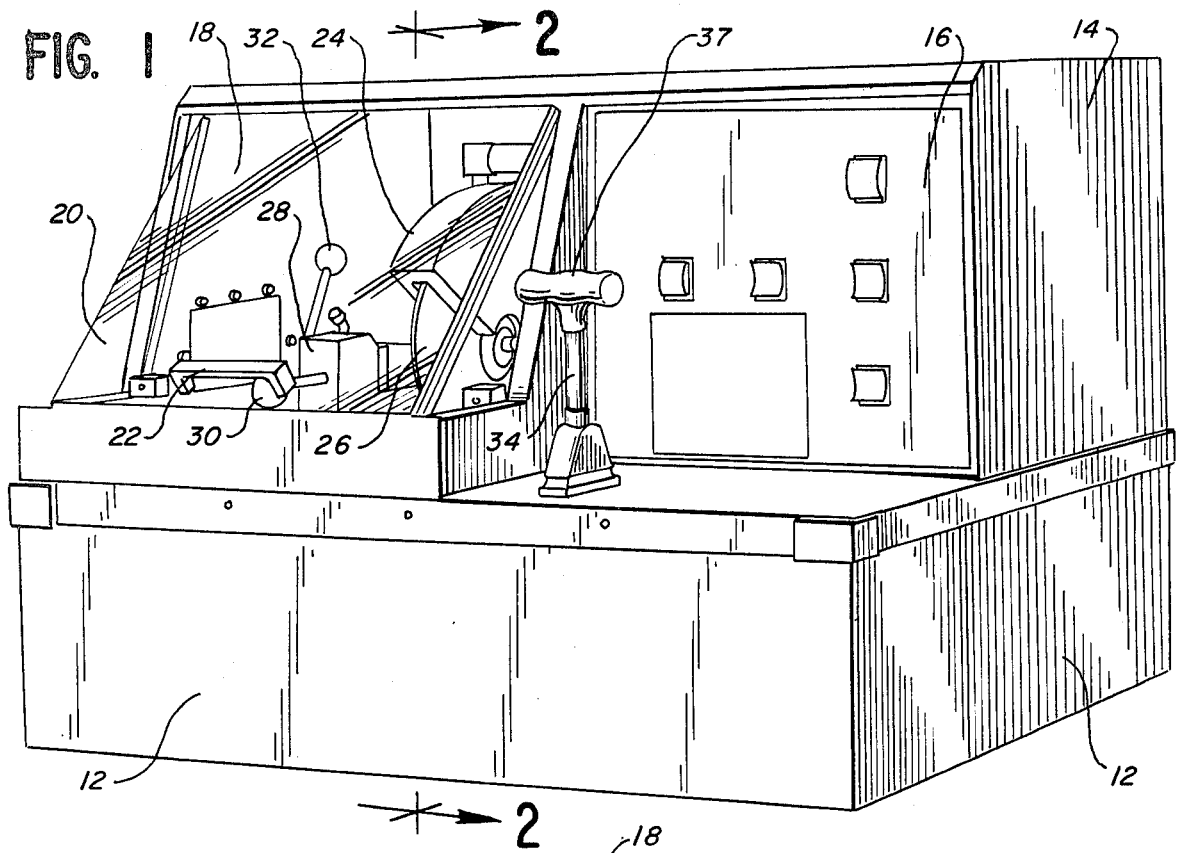
FIG. 1 is a perspective view of an abrasive cutter constructed in accordance with the present invention.

Referring now to the drawings, FIG. 1 shows an abrasive cutter 10 including a lower housing 12, an upper housing 14, a control panel 16, a cutting chamber 18, and a transparent plastic access door 20 having a handle 22. The access door 20 is shown in its down position where it must be when the abrasive cutter is being operated. However, the operator may use the handle 22 to swing the door upwardly to an open position to gain access to the cutting chamber 18.

The components located within the cutting chamber 18 include a wheel guard 24, an abrasive cutting wheel 26, a vise 28 for holding a workpiece to be cut, a vise control rod 30 which is used to open and close the vise, and a vise locking lever 32. There is further shown in FIG. 1 a workpiece advance lever 34 which is moved toward the control panel 16 to advance a workpiece into engagement with the abrasive cutting wheel 26 and is moved away from the control panel to withdraw the workpiece from the cutting wheel, as will be explained in more detail hereinafter.

One of the features of the present invention relates to the mounting of the workpiece-holding vise 28 on a carrier which is slidable in a horizontal plane toward and away from the cutting wheel 26. The carrier on which the vise 28 is mounted is shown in top plan view at 36 in FIGS. 3, 4 and 6, the showing being only in dotted lines in FIG. 4. The vise carrier 36 includes a base 38, and an upright wall 40 best shown in FIGS. 2 and 7.

Figure 7:
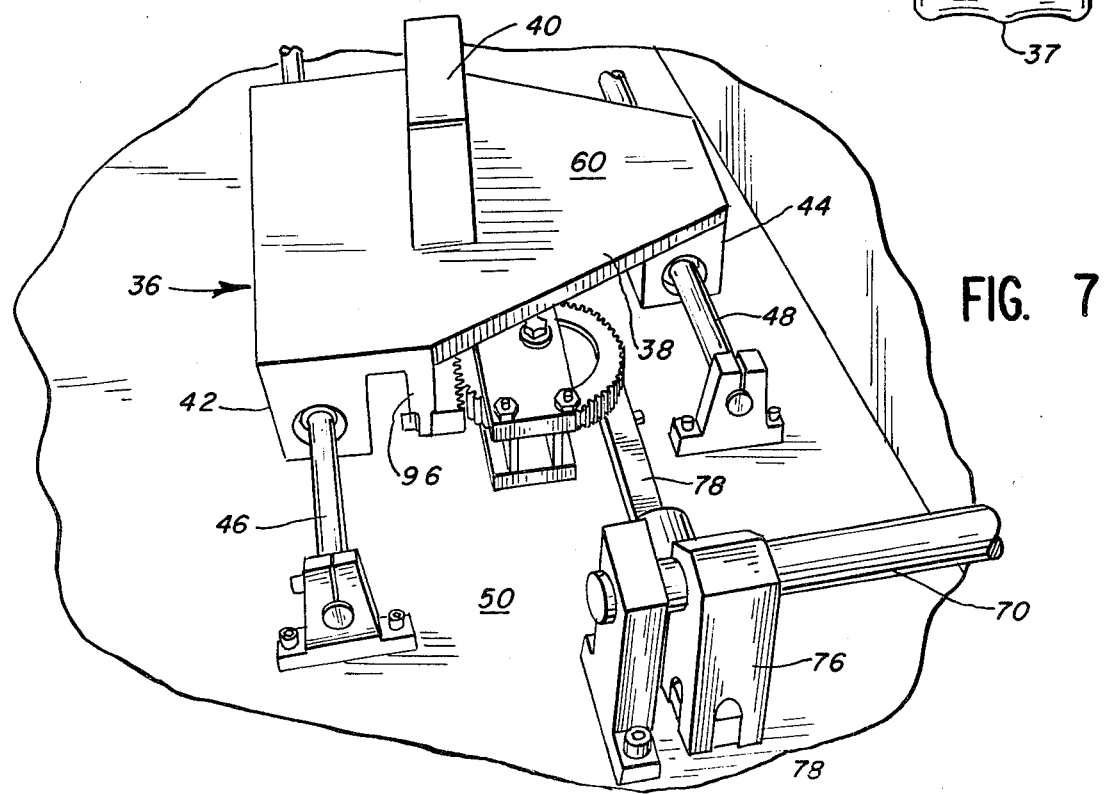
FIG. 7 is a fragmentary detail perspective view showing the vise platform and the two horizontal vise support shafts on which is slides, and also of the mechanism for advancing and retracting the platform.

Moreover, as shown in FIG. 7, the vise carrier base 38 has a pair of depending legs 42 and 44 each of which extends horizontally in a front-to-back direction relative to the abrasive cutter machine. Each depending leg 42 and 44 is formed with an opening extending throughout its length to receive a corresponding one of the vise support shafts 46 and 48 on which the vise carrier 36 is mounted for horizontal sliding movement.

Referring to FIGS. 3, 4, 6 and 7, it will be seen the vise support shaft 46 is supported on a base 50 by a pair of shaft supports 52 and 54 located at opposite ends of the shaft 46 and screwed or otherwise secured to base 50. In a similar manner, the second vise support shaft 48 is supported on the base 50 by a pair of shaft supports 56 and 58 located at opposite ends of shaft 48 and screwed to the base 50. In accordance with the preferred embodiment the vise support shafts 46 and 48 comprise precision ways, and the depending legs 42 and 44 of the vise carrier 36 are provided with antifriction bearings so that the vise carrier 36 is slidable along a straight horizontal path with a minimum of frictional resistance.

Figure 2:
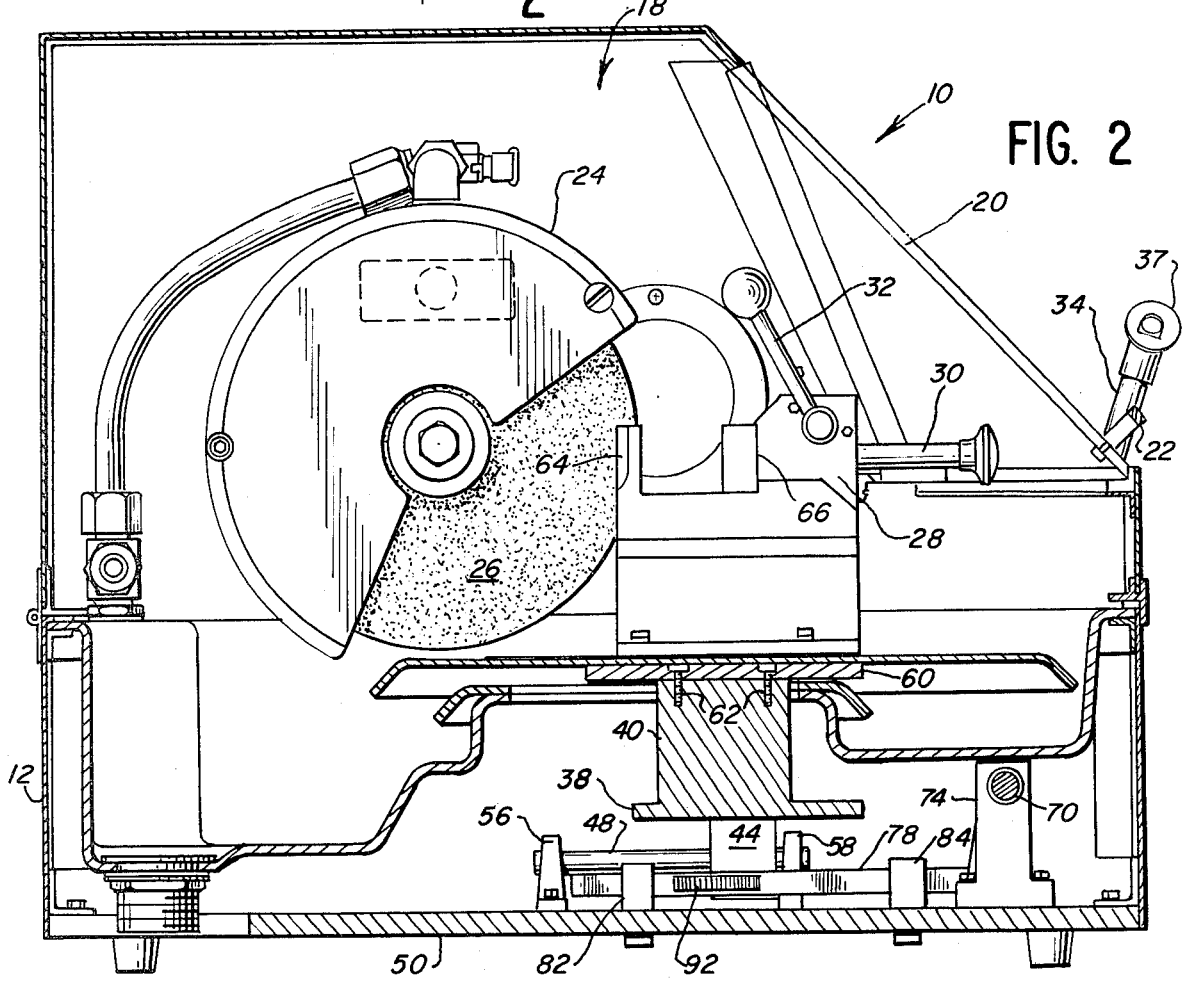
FIG. 2 is a vertical sectional view taken approximately along the line 2—2 of FIG. 4.

FIG. 2 shows the manner in which the vise 28 is mounted on the vise carrier 36. As described above, the vise carrier includes an upright wall 40, and a vise platform 60 is secured to the top of the wall 40 by screws 62. The vise platform 60 provides a flat horizontal mounting surface for the vise 28 which is rigidly mounted on the platform by screws or other suitable securing means. Accordingly, the vise 28 is fixedly mounted on the vise carrier 36 and is slidable along a straight horizontal path defined by the vise support shafts or ways 46 and 48.

Figure 3:
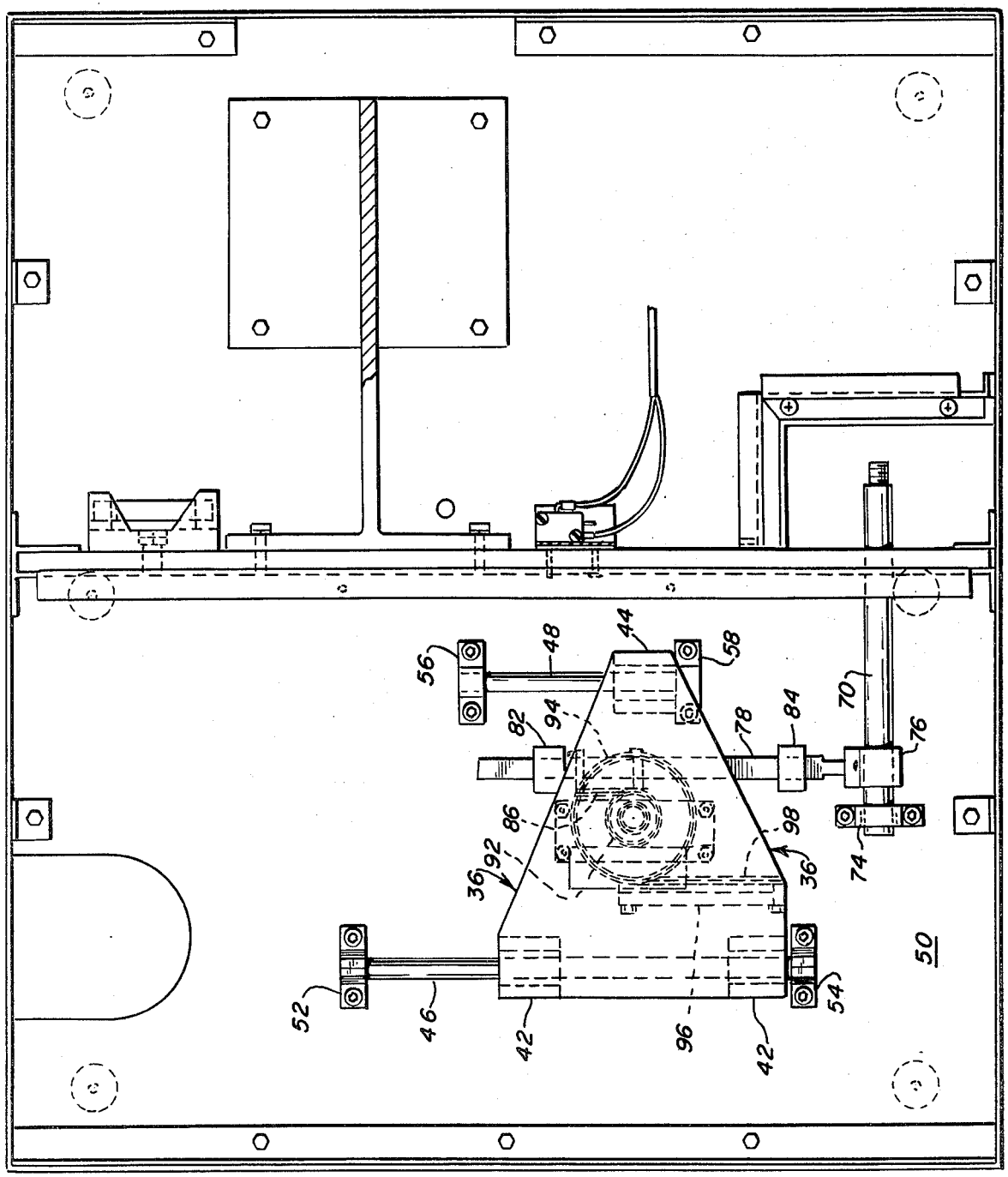
FIG. 3 is a top plan view with the top portion of the housing and several other components removed to illustrate in particular the vise platform and the means for mounting and moving the same.
Figure 4:
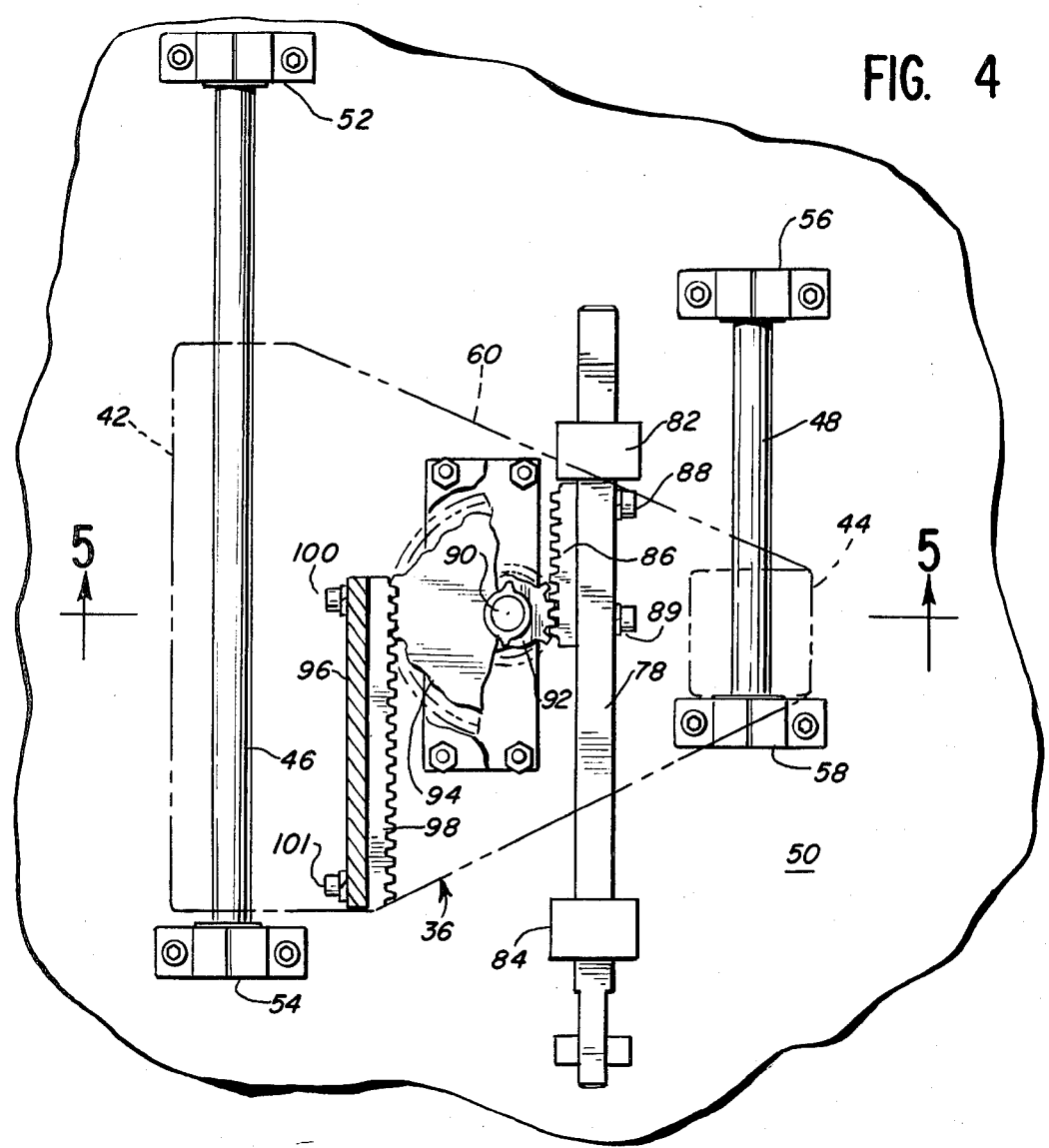
FIG. 4 is a top plan detail view showing the vise support shaft members on which the vise platform is mounted for horizontal sliding movement and showing gear and rack means for moving the platform along the shafts.
Figure 6:
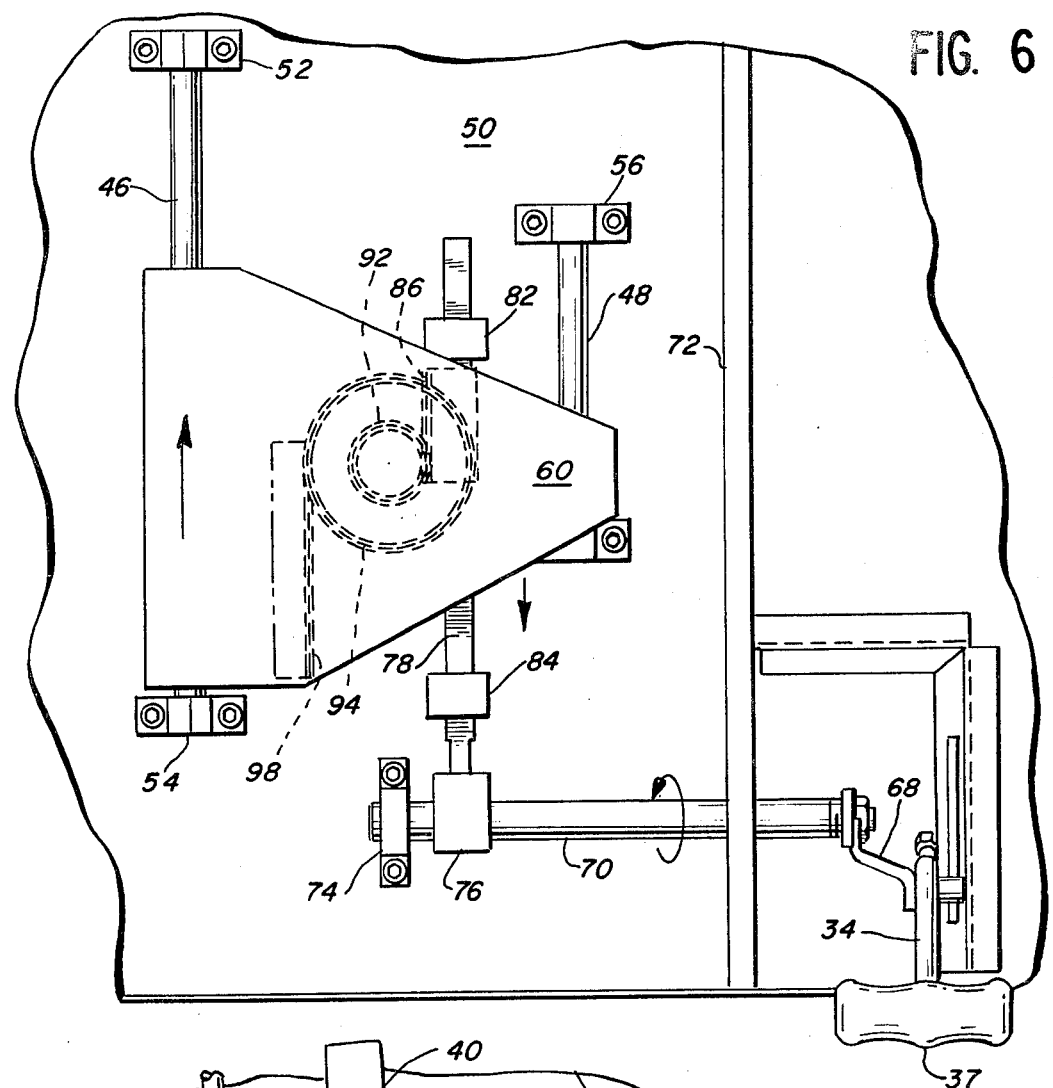
FIG. 6 is a further detail top plan view showing the vise platform and a manually operable advance lever and mechanism interconnecting the lever with the vise platform for advancing and retracting the latter.

FIGS. 3, 4 and 6 show the vise carrier 36 in its retracted position away from the cutter wheel 26. In that position, a workpiece such as a methallurgical sample to be sliced may be placed between the jaws 64 and 66 (see FIG. 2). The control rod 30 is used to close the jaw 66 against the workpiece, and the vise may then be locked by the locking lever 32 thereby locking a workpiece in the vise 28. workpiece is positioned in the vise so that a portion to be sliced off projects out to the right as viewed in FIG. 1 into a position in alignment with the cutter wheel 26. Therefore, by advancing the vise carrier 36 back along the shafts 46 and 48, a workpiece is moved along a straight horizontal path into the cutter wheel 26 for a cutting operation.

Figure 9:
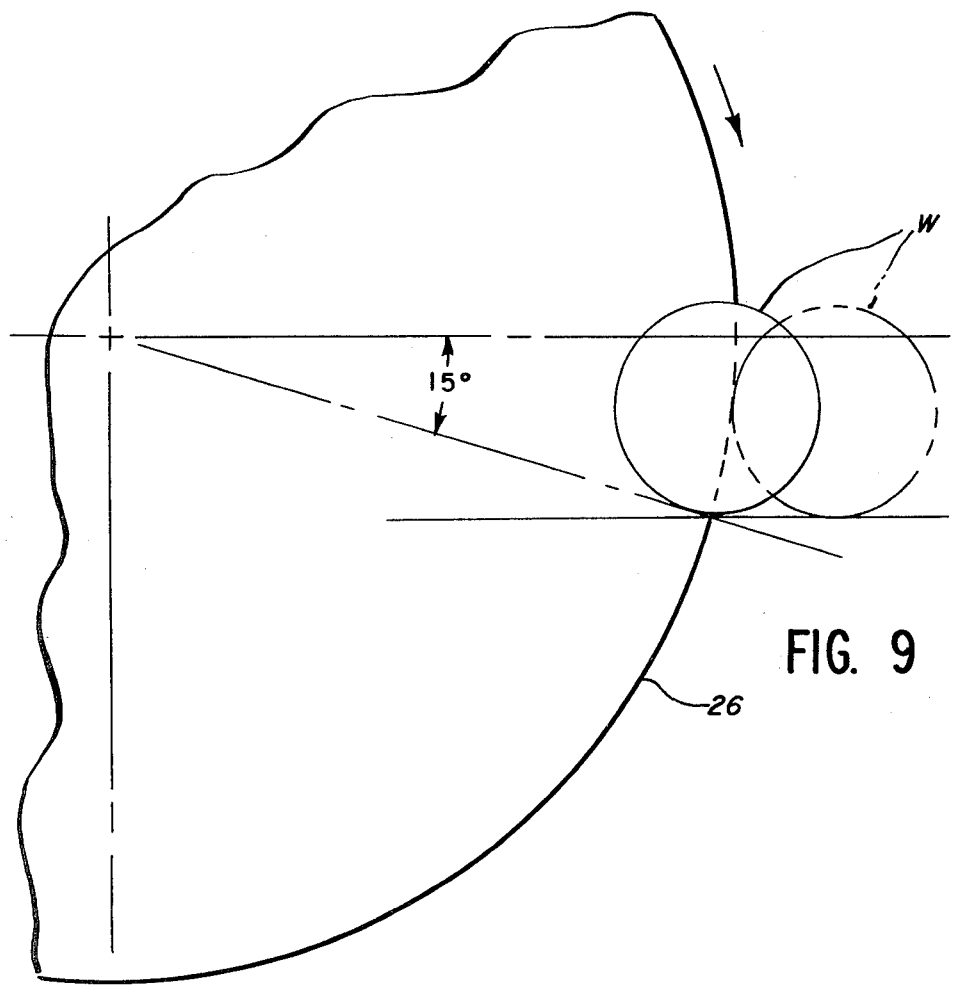
FIG. 9 is a schematic side elevational view illustrating the relative positions of a rotating cutter wheel and a workpiece as the workpiece is brought into engagement with the wheel for a cutting operation.

In accordance with a preferred embodiment of the invention, the vise 28 is positioned relative to the cutting wheel 26 so as to achieve a relationship between a workpiece W and the cutter wheel 26 as shown in FIG. 9. Extremely accurate cutting is an objective of the present invention because the cutter is intended primarily for laboratory use in the cutting of metallurgical samples. Such accuracy is increased greatly by the present invention which moves a workpiece along a horizontal straight line into the cutting blade. Such a design permits the blade mounting spindle and motor (not shown) to be rigidly mounted to afford very precise and consistent cutting of a workpiece. In addition, by providing the relationship shown in FIG. 9, the workpiece always contacts the blade in an area which is optimum for cutting, namely, within 15 degrees of the blade centerline.

The mechanism for advancing and retracting the vise carrier 36 along the shafts or ways 46 and 48 will now be described. FIG. 1 shows the location of the workpiece advance lever 34, and as previously explained an operator pushes the lever rearwardly toward control panel 16 in order to advance a workpiece into the path of the cutter wheel 26. The lever 34 includes a handle 37 for gripping by an operator.

FIG. 6 shows the advance lever 34 connected by a link 68 to one end of an actuator shaft 70 which extends through a wall 72 of the cutter housing and which is journalled in a bushing (not shown) in that wall and by a shaft support 74 located at the outer end of the actuator shaft. The actuator shaft 70 is rotated by pivoting movement of the advance lever 34 to the left (as viewed in FIG. 2) to advance the workiece to the cutting blade 26 and lever 34 is pulled to the right to withdraw the workpiece.

A crank 76 is fixedly mounted on the actuator shaft 70 near the outer end thereof as shown in FIG. 6. As best shown in FIG. 7, crank 76 depends downwardly where it is connected to the forward end of a rack drive shaft 78. The rack drive shaft 78 is parallel to the two vise support shafts or ways 46 and 48 on which the vise carrier 36 is mounted, and in the embodiment disclosed the shaft 78 is square in cross-section (see FIG. 5).

Figure 5:
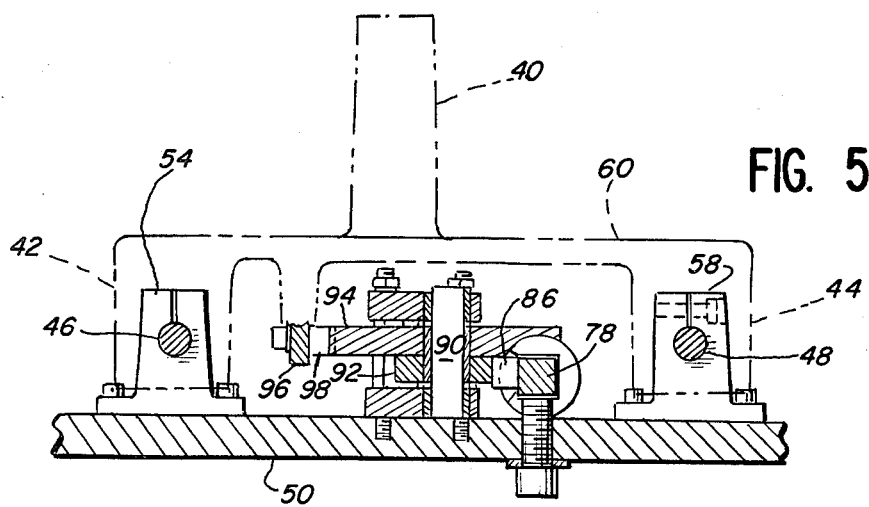
FIG. 5 is a fragmentary detail vertical sectional view showing the vise platform and the rack and gear means for moving the same along a horizontal path.

Referring now to FIGS. 4 and 5, rack drive shaft 78 is mounted in bearings 82 and 84 for sliding movement parallel to the vise support shafts 46 and 48, the shaft 78 being shown in its forward position in FIG. 4. The rack drive shaft 78 has a rack 86 fixedly secured to its rear end by screws 88 and 89.

FIG. 5 shows an upright transmission shaft 90 fixedly mounted from baseplate 50. A pair of gears are mounted on and keyed to the transmission shaft 90 including a first relatively small gear 92 and a second larger gear 94 mounted on shaft 90 immediately above gear 92. The smaller gear 92 is in engagement with rack 86 (as best shown in FIG. 4) and thus movement of rack 86 rearwardly will cause counterclockwise rotation of the small gear 92. Such movement of rack 86 will also cause counterclockwise rotation of the larger gear 94, since both gears are keyed to the common transmission shaft 90.

It will further be seen from FIG. 5 that vise carrier 36 has a third depending leg 96 to which a rack 98 (see also FIG. 4) is secured by screws 100 and 101. The rack 98 extends parallel to the vise support shafts 46 and 48 and is in engagement with the larger gear 94. Therefore, movement of the first rack 86 rearwardly will effect counterclockwise rotation of gear 92, transmission shaft 90 and gear 94, causing forward movement of rack 98 and vise carrier 36, and vice versa.

The operation of the workiece feed mechanism of the present invention will now be briefly reviewed. When an operator has mounted a workpiece in the vise 28 and wishes to advance the workpiece into the path of the rotating cutter wheel 26, the operator grips handle 37 of advance lever 34 and pushes the same rearwardly (toward control panel 16 as viewed in FIG. 1). Such rearward movement of lever 34 causes rotation of actuator shaft 70 (see FIG. 6), which in turn moves the lower end of crank 76 forwardly (see FIG. 7) thereby causing rack drive shaft 78 (see also FIG. 4) to be pulled forwardly.

As shown in FIG. 4, such forward movement of rack drive shaft 78 will produce clockwise rotation of gear 92, transmission shaft 90 and gear 94, thereby causing rearward movement of rack 98, vise carrier 36 and vise 28, so as to advance a workpiece mounted in the vise into the path of cutter wheel 26 for slicing off a section of the workpiece.

It is an important feature of the present invention that a ratio is provided between movement of the manually operable advance lever 34 and movement of the vise 28. Such a ratio is preferably in the range of 1.5 to 1 and 3 to 1, meaning that there should preferably be between 1.5 and 3 inches of travel of the manually operable handle 37 for each inch of movement of the vise 28 and workpiece, thereby affording optimum "feel" of the cut to the operator to permit extremely accurate cutting without damage to the workpiece or the mechanism. In the particular embodiment described, the foregoing ratio is approximately 2 to 1.

Figure 8:
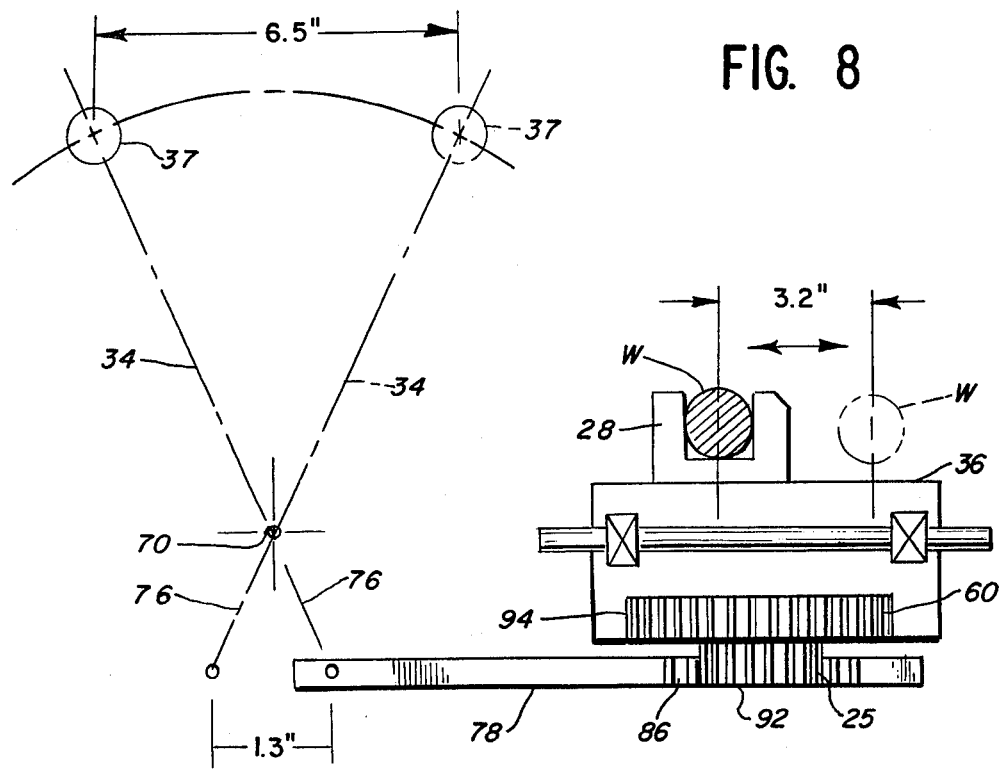
FIG. 8 is a schematic side elevational view illustrating the relationship between movement of the manually operable workpiece advance lever and movement of the vise platform and the vise mounted thereon.

FIG. 8 comprises a schematic illustration of the ratio between movement of the upper end of the advance lever 34 and movement of the vise 28, and specimen workpiece W along their horizontal path. In the embodiment disclosed, the length of the advance lever 34 is over three times the effective length of the crank 76, which absent other factors would afford a ratio of hand movement to workpiece movement in excess of 3 to 1. However, in the embodiment described, the smaller gear 92 has 25 teeth while the larger gear 94 has 60 teeth, and the foregoing ratio of the gear teeth tends to offset the difference in the lengths of the lever 34 and crank 76 and increases workpiece motion.

Thus, gears 92 and 94 rotate through the same arc because they are keyed to the common transmission shaft 90. However, the larger gear 94 has more teeth than the smaller gear 92 for a given arc, and thus the gears afford a greater linear movement of rack 98 compared to the movement of drive rack 86.

Taking into account both of the foregoing factors, the preferred embodiment of the present invention requires approximately two inches of operator hand movement to produce one inch of workpiece movement, and such a ratio has been found to permit consistently superior cutting of specimen workpieces.

What is claimed is:

1. A cutter machine comprising, in combination, a motor-driven cutting wheel mounted in a cutting chamber for rotation about a horizontal axis extending from side-to-side relative to said machine, a workpiece holder carried on a platform mounted forwardly of said cutting wheel for horizontal sliding movement in said cutting chamber along a straight line in a front-to-back direction relative to said machine, a manually operable generally upwardly extending workpiece advance lever located substantially forwardly and to one side of said platform to afford convenient access to an operator and yet be remote from said cutting chamber, said advance lever being connected at its lower end to a rotatable platform drive shaft, said drive shaft extending laterally from the lower end of said advance lever into said cutting chamber to a location forwardly of said platform, crank means mounted on said drive shaft in said cutting chamber, and rack and pinion drive means operated from said crank means for effecting rearward sliding movement of said platform when said advance lever is pivoted rearwardly and effecting forward sliding movement of said platform when said advance lever is pivoted forwardly.

2. A cutter machine as defined in claim 1 where said cutting chamber has a transparent cover to close the same during a cutting operation, said advance lever being located outside of said chamber to be accessible to an operator when said cover is closed.

3. A cutter machine as defined in claim 1 where said advance lever is at least two times as long as said crank means to provide a ratio of operator hand movement of said lever to movement of said platform of at least 1.5 to 1.

4. A cutter machine as defined in claim 1 where said rack and pinion drive means includes a first rack member connected to said crank and extending rearwardly therefrom, and a second rack member mounted on said platform in parallel relation to said first rack member, and said pinion means interconnecting said first and second rack members.

5. A cutter machine as defined in claim 4 where said pinion means includes first and second pinions mounted on a common axis for conjoint rotation, said first pinion being mounted in engagement with said first rack member to be driven thereby, and said second pinion being mounted in engagement with said second rack member to drive said platform.

6. A cutter machine as defined in claim 5 where said advance lever is over two times as long as said crank means to provide a high ratio of operator hand movement of said lever to movement of said platform, but said first pinion is smaller than said second pinion so as to reduce said ratio to a desired amount.

* * * * *